United States Patent [19]

Kitagawa

[11] 4,149,819
[45] Apr. 17, 1979

[54] MULTIPLE SPINDLE DRILLING MACHINE FOR LANDSLIDE PROTECTION WIDE FLANGE BEAMS

[75] Inventor: Toshikatsu Kitagawa, Seki, Japan

[73] Assignee: Industry Company Limited Miyakawa, Gifu, Japan

[21] Appl. No.: 843,240

[22] Filed: Oct. 18, 1977

[30] Foreign Application Priority Data

Oct. 21, 1976 [JP] Japan .................................. 51-126685

[51] Int. Cl.$^2$ ........................ B23B 39/18; B23B 41/00
[52] U.S. Cl. ......................................... 408/50; 408/70
[58] Field of Search .................... 408/37, 39, 41, 42, 408/50, 52, 53, 70, 13

[56] References Cited

U.S. PATENT DOCUMENTS

| 2,808,746 | 10/1957 | Blomquist | 408/70 X |
| 3,090,261 | 5/1963 | Hill | 408/13 X |
| 3,555,963 | 1/1971 | Evans | 408/42 |
| 3,977,804 | 8/1976 | Kitagawa | 408/50 X |

FOREIGN PATENT DOCUMENTS 419326  4/1972  U.S.S.R. ................................... 408/70

Primary Examiner—Leonidas Vlachos
Attorney, Agent, or Firm—George B. Oujevolk

[57] ABSTRACT

A multiple spindle drilling machine for landslide protection wide flange beams, comprising a feed device for transporting on a machine stand a landslide protection wide flange beam in the longitudinal direction thereof intermittently by a predetermined length at a time, a drilling device adapted to drill the surface of at least one of the two left and right flanges and the web of the landslide protection wide flange beam every time the feed device stops the transportation operation, and a feed pitch correcting device including positioning means so disposed that every time the feed device stops the transportation operation, the positioning means are inserted in holes previously drilled in the wide flange beam to correct the position of the wide flange beam in the longitudinal direction thereof.

11 Claims, 18 Drawing Figures

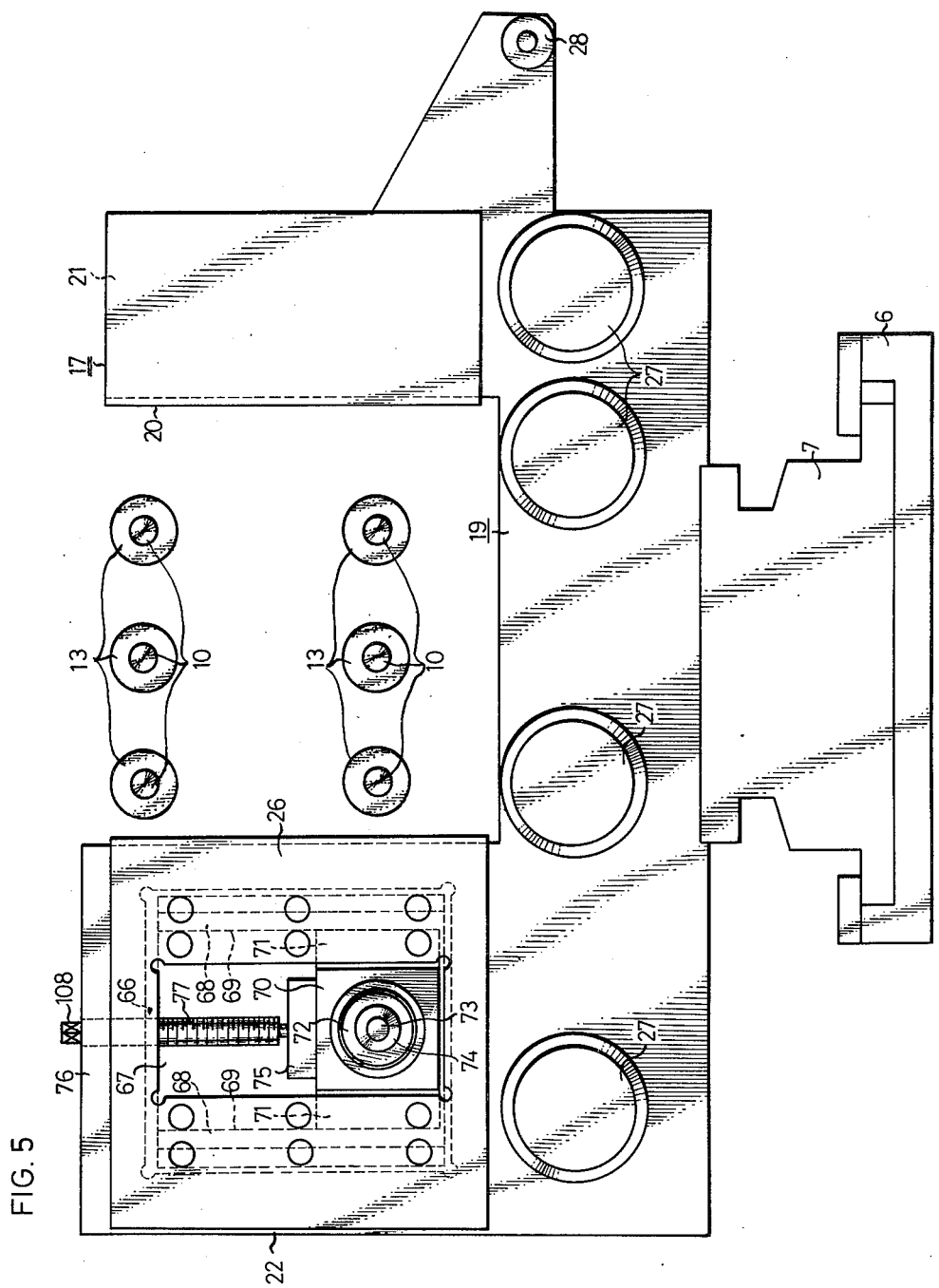

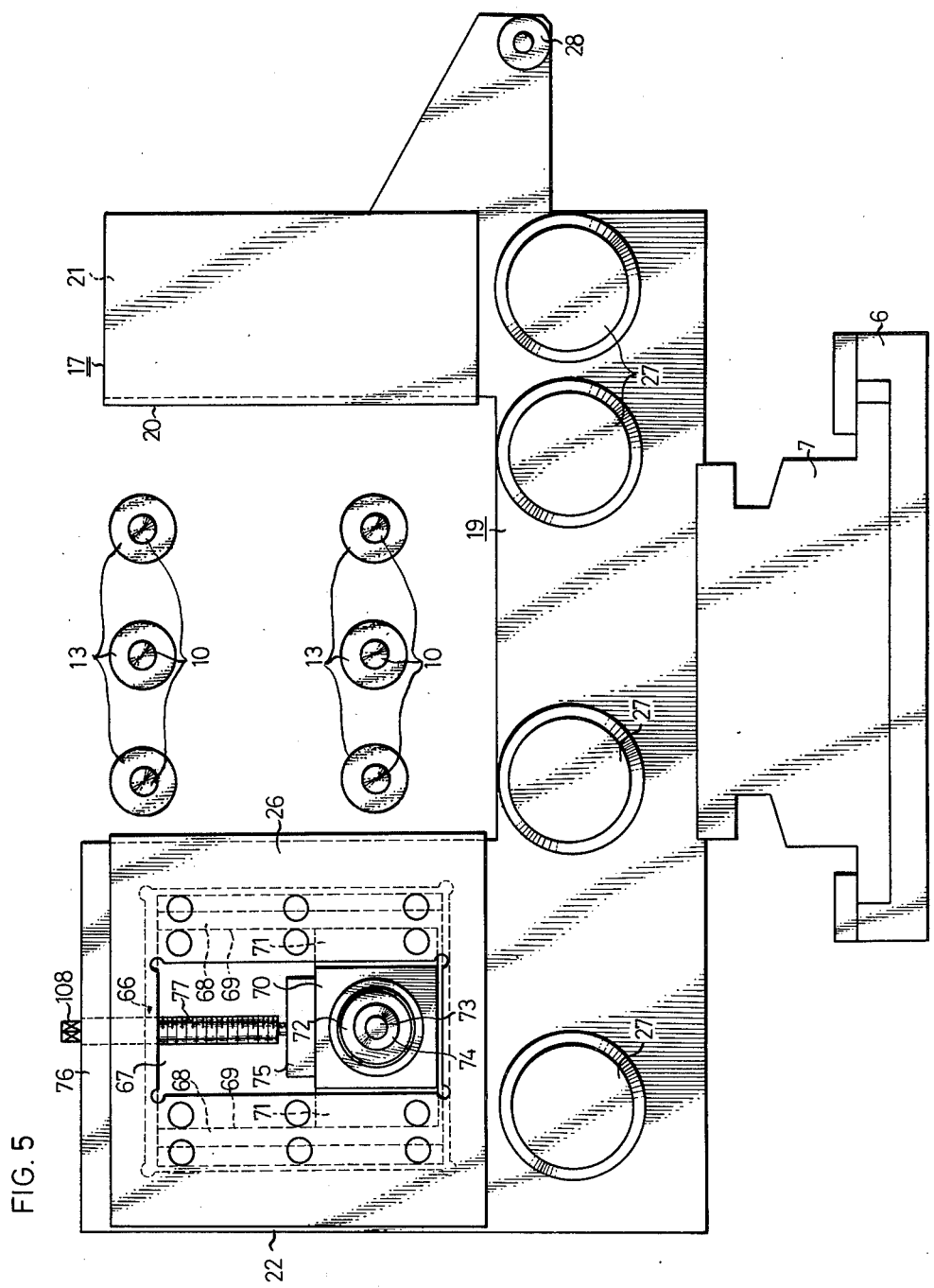

MULTIPLE SPINDLE DRILLING MACHINE FOR LANDSLIDE PROTECTION WIDE FLANGE BEAMS

BACKGROUND OF THE INVENTION

The present invention relates to a multiple spindle drilling machine for drilling a great number of connecting holes in landslide protection wide flange beams.

In landslide protection wide flange beams for use in construction of bridges, harbor construction works and underground construction works, as shown in FIGS. 1-(a) to 1-(c), square end plates 105 are welded and fixed to a wide flange beam or H-beam 102 at both the ends in the longitudinal direction, and a pair of reinforcing ribs 106 are fixed on both the top and bottom faces of a web 103 of the wide flange beam 102 so that the inner faces of the respective end plates 105 are connected to both the ends of the web 103, respectively. A pair of flanges 104 of the wide flange beam 102 have a great number of holes 107 drilled along the entire lengths thereof including parts close to both the ends thereof. These holes are arranged in zigzags in one or two upper rows and one or two lower rows and are spaced from one another at predetermined intervals. In the web 103, a plurality of holes 107 are drilled in two rows only in both the side portions in the longitudinal direction and they are spaced from one another at predetermined intervals. In general, in both the flanges 104 and the web 103, the distance between every two holes adjacent to each other in the longitudinal direction is set as 100 mm. When the landslide protection wide flange beam 101 is actually used, it is connected to other wide flange beam, a plate or the like. Accordingly, a high precision is required for this hole distance.

In order to drill holes while keeping the hole distance precise, according to the conventional method, drilling positions are marked on the flanges 104 and web 103, and then, the drilling operation is conducted manually by using a drilling machine. However, this manual drilling operation is a heavy work and the operation efficiency is extremely low. Further, since an error is allowed in a scale to be used for marking, precision positioning cannot be accomplished by such marking method and hence, positions of drilled holes become inaccurate.

OBJECTS OF THE INVENTION

It is a primary object of the present invention to provide a multiple spindle drilling machine for landslide protection wide flange beams, which can perform the drilling operation on landslide protection wide flange beams continuously at high efficiency with precision.

Another object of the present invention is to provide a multiple spindle drilling machine for landslide protection wide flange beams, which has a feed device capable of transporting backward a landslide protection wide flange beam intermittently by a predetermined length at a time by a simple mechanism.

Still another object of the present invention is to provide a multiple spindle drilling machine for landslide protection wide flange beams, which has a feed pitch correcting device capable of correcting feed pitches of a landslide protection wide flange beam assuredly by a simple mechanism.

A further object of the present invention is to provide a multiple spindle drilling machine for landslide protection wide flange beams, which has a correcting device for correcting the lateral position of a landslide protection wide flange beam placed on the machine stand.

Other objects of the present invention will be apparent from embodiments illustrated hereinafter and set forth in the appended claims. Further, various advantages of the present invention not specifically mentioned herein will be apparent to those skilled in the art when the present invention is worked.

BRIEF DESCRIPTION OF THE DRAWING

FIG. 1-(b) is a plan view of the landslide protection wide flange beam shown in FIG. 1-(a).

FIG. 1-(c) is a front view of the landslide protection wide flange beam shown in FIG. 1-(a).

FIG. 5 is a side view showing a movable gripping member of the drilling machine illustrated in FIG. 2.

DETAILED DESCRIPTION OF THE PREFERRED EMBODIMENTS

Embodiments of the present invention will now be described by reference to FIGS. 2 to 13.

Figure 2:
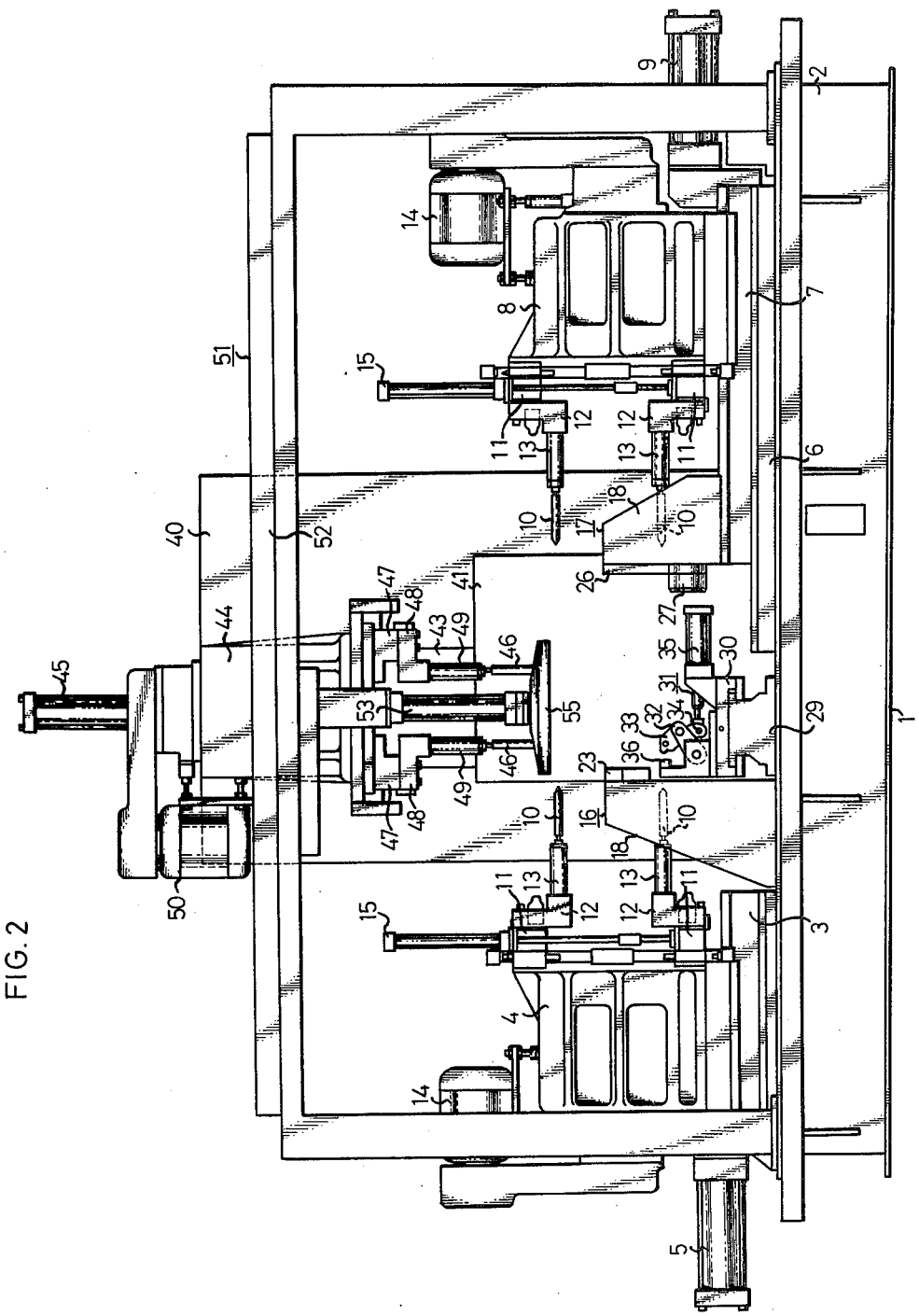
FIG. 2 is a front view illustrating a multiple spindle drilling machine for landslide protection wide flange beams according to the present invention.

In the drawing, reference numeral 1 represents a multiple spindle drilling machine of the present invention, and reference numeral 2 represents a machine stand thereof. A guide member 3 is mounted on the left side of the front portion (the right portion in FIG. 3) of the machine stand 2 and it extends in the left-right direction, as shown in FIG. 2. A left gear box 4 is disposed on the guide member 3 so that it can be moved to the left and right along the guide member 3 by a hydraulic cylinder 5 fixed to the left end of the guide member 3.

On the right side of the machine stand 2, a guide rail 6 is disposed at a position corresponding to the position of the left gear box 4, and it extends in the left-right direction like the guide member 3. A slide member 7 is supported on the guide rail 6 so that it is slid to the left and right when a screw lever (not shown) mounted on the right end of the slide member 7 is rotated through a torque clutch by a motor. A right gear box 8 is disposed on the slide member 7, and like the above-mentioned left gear box 4, this right gear box 8 is moved to the left and right by a hydraulic cylinder 9 fixed to the right end of the slide member 7.

A plurality of drills 10 aligned into rows in the lateral direction are mounted on each of the left side face of the right gear box 8 and the right side face of the left gear box 4 through a pair of upper and lower movable members 11, holding members 12 and drill-fitting spindles 13, so that the drills 10 on the left side face of the right gear box 8 confront the drills 10 on the right side face of the left gear box 4 and they are simultaneously rotated by motors 14 on the respective gear boxes 4 and 8. The positions of these drills 10 can be adjusted in both the front-rear direction (the left-right direction in FIG. 3) and the vertical direction. The vertical movement of the drills 10 is accomplished by hydraulic cylinders 15 mounted on the top faces of the front ends of the respective movable members 11. Further, these drills 10 are dismountably attached to the spindles 13 and the number of these drills 10 can be changed as well as the number of the holding members 12. In general, three drills 10 are disposed in one stage and the distance between two adjacent drills 10 in the front-rear direction is kept constant.

Figure 4:
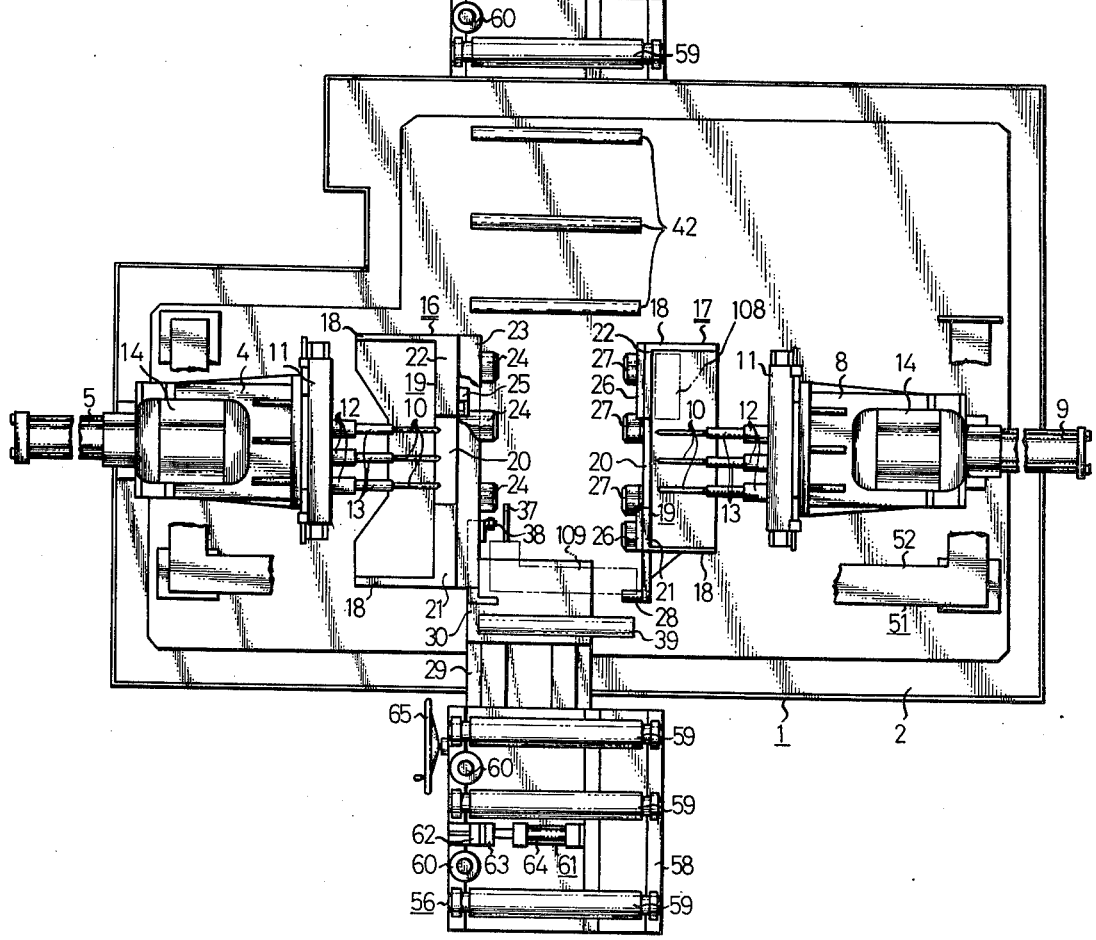
FIG. 4 is a plan view showing the drilling machine illustrated in FIG. 2.

As shown in FIGS. 2 and 4, a pair of fixed and movable gripping members 16 and 17 are disposed on the top face of the machine stand 2 on the right side of the guide member 3 and on the top face of the left end of the slide member 7, respectively, and they extend in the vertical direction and they face each other so that they grip a landslide protection wide flange beam 101 from both the left and right sides. Each of the gripping members 16 and 17 comprises a pair of front and rear side plates 18 and an attachement 19 connecting these side plates 18 and it has a channel-like plane. Each attachment 19 is notched at a part corresponding to the left or right group of the drills 10, and the upper portion of the attachment 19 is divided in a front attachment 21 and a rear attachment 22 by this notched part 20.

Doubling plates 23 are fixed to the right side faces of the front and rear attachments 21 and 22 of the fixed gripping member 16 and between these attachments 21 and 22, and a plurality of overhung supporting rollers 24 are supported on the lower portion of the attachment 19 of the gripping member 16 and they are arranged so that they can rotate freely. A stopper 25 for setting the position of the top end of the landslide protection wide flange beam 101 is mounted on the right side of the rear attachment 22 slightly above the supporting rollers 24 so that it can project in the direction of the top ends of the supporting rollers 24.

As shown in FIGS. 4 and 5, a pair of doubling plates 26 are fixed to the left side faces of the front and rear attachments 21 and 22 of the movable gripping member 17, and a feed pitch correcting device 108, which constitutes a characteristic part of the present invention, is attached to the rear doubling plate 26 and the rear attachment 22. A plurality of overhung supporting rollers 27 are freely rotatably supported on the lower portion of the attachment 19 of the movable gripping member 17, and these rollers 27 and the above-mentioned rollers 24 support the wide flange beam 101 horizontally. A small-diameter overhung auxiliary supporting roller 28 is attached to the left side face of a forwardly projected part of the attachment 19 of the movable member 17 to support the wide flange beam 101 together with the supporting rollers 27.

Figure 3:
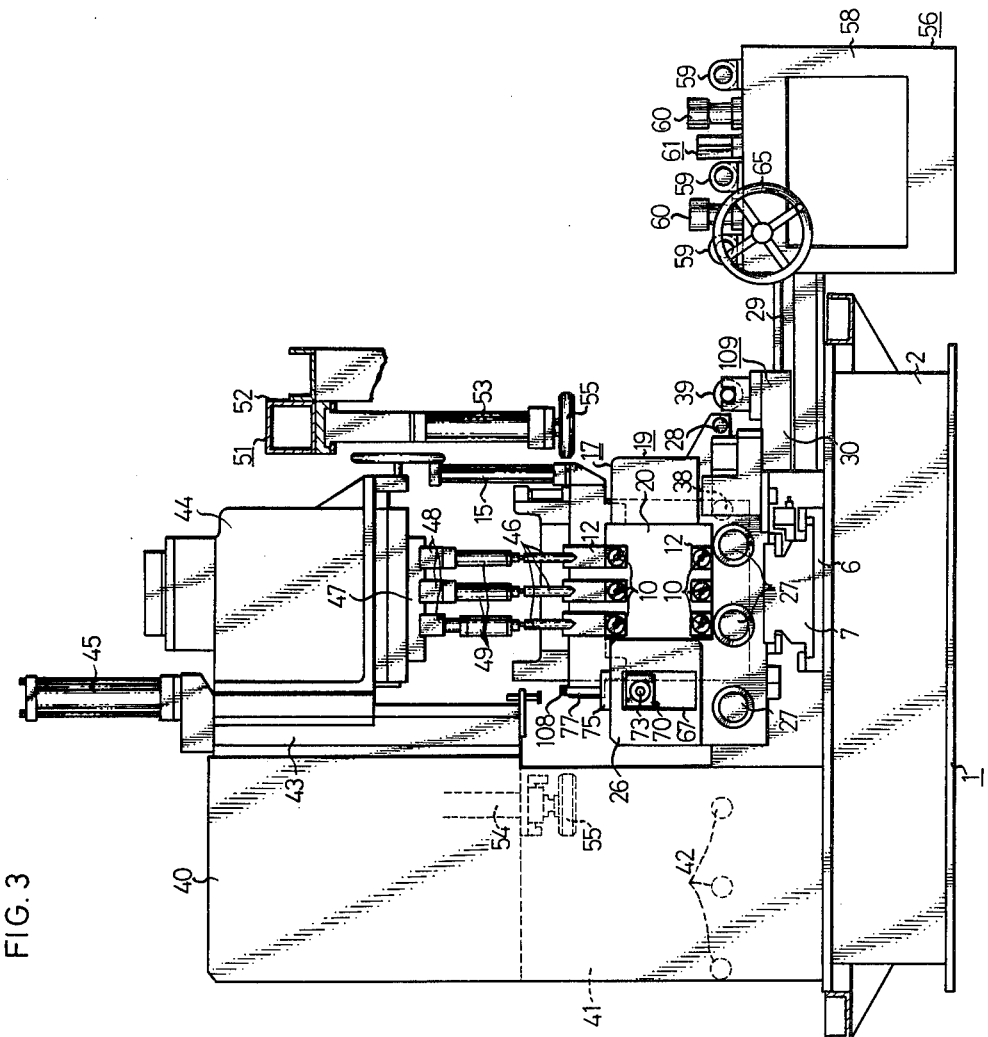
FIG. 3 is a side view showing the drilling machine illustrated in FIG. 2.
Figure 6:
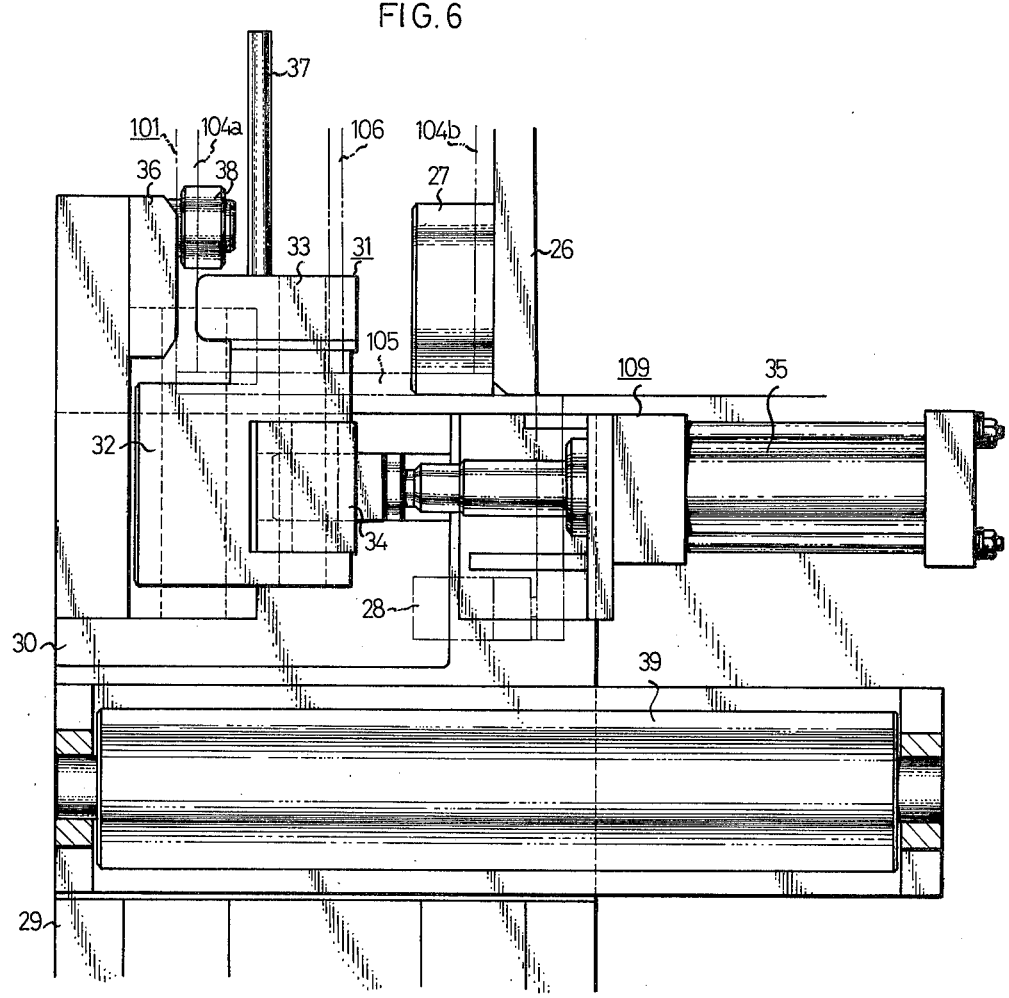
FIG. 6 is a plan view showing a predetermined length feed device in the state where a chuck is operated.
Figure 7:
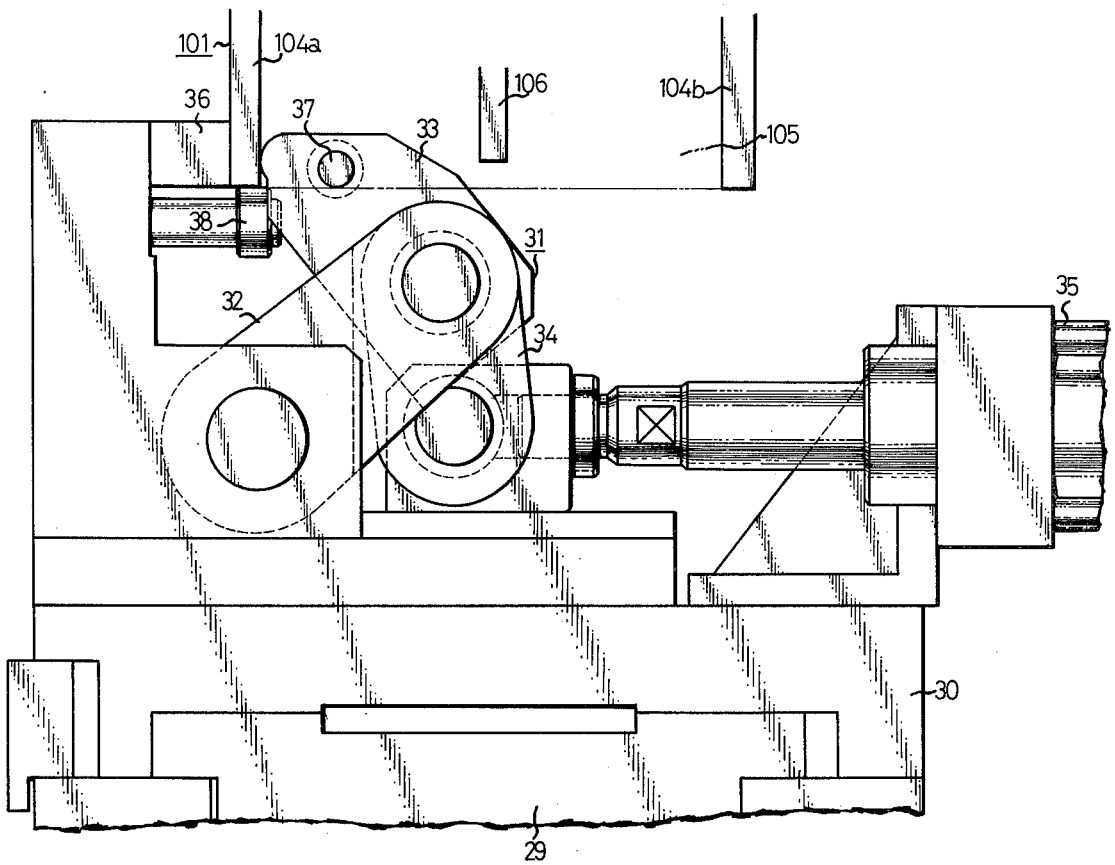
FIG. 7 is a front view showing the feed device shown in FIG. 6 in the chuck-operated state.

As shown in FIGS. 2 and 4, a feed device 109 is disposed on the machine stand 2 in front of the space between both the gripping members 16 and 17 to transport backward the landslide protection wide flange beam 101 intermittently by a predetermined length at a time. This feed device 109 is supported on a supporting stand 29 extending in the front-rear direction. As shown in FIGS. 2 and 3, a chuck mechanism 31 is attached to the top face of the front end of a moving stand 30 capable of moving to and fro on the supporting stand 29, so that the chuck mechanism 31 holds and grips the lower end of a left flange 104a of the wide flange beam 101 in the state where the left flange 104a is caused to bear against the doubling plate 23 of the fixed gripping member 16 as shown in FIGS. 6 and 7.

Figure 8:
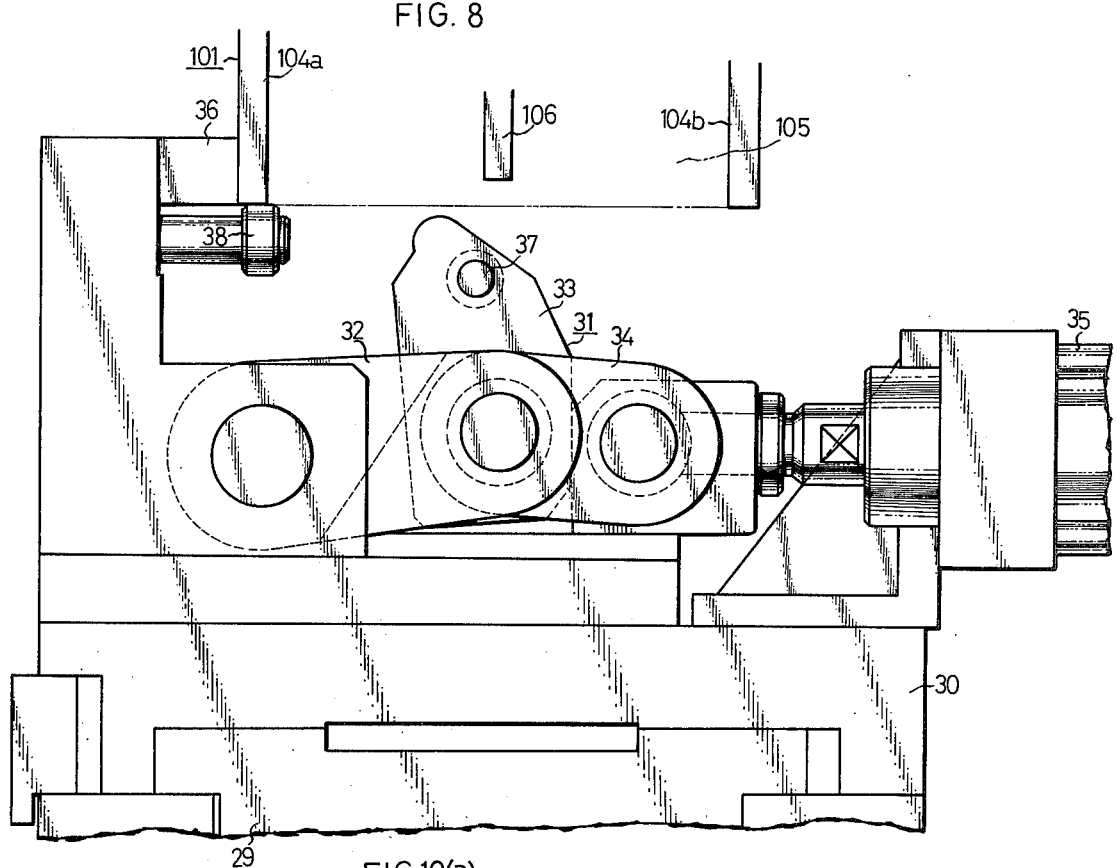
FIG. 8 is a front view showing the feed device shown in FIG. 6 in the state where the chuck is not operated.

The chuck mechanism 31 comprises an inclining piece 32 pivoted so that its lower end can incline to the moving stand 30, a fixed gripping piece 33 fixed to the top end of the inclining piece 32 so that the top end is directed upwardly, a hydraulic cylinder 35 for inclining these pieces 32 and 33 integrally through an interlocking link 34, and a fixed gripping piece 36 mounted on the moving stand 30 to grip the wide flange beam 101 between the movable gripping piece 33 and the fixed gripping piece 36. When the wide flange beam is not gripped, the top end of the movable gripping piece 33 of the chuck mechanism 31 is brought down and located below the lower end of the end plate 105 of the wide flange beam 101 placed on the supporting rollers 24, 27 and 28. As shown in FIGS. 6 to 8, a stopper 37 for setting the position of the rear end of the landslide protection wide flange beam 101 is projected from the top end portion of the movable gripping piece 33 of the chuck mechanism 31 and it extends backward. When the movable gripping piece 33 performs the gripping operation, the stopper 37 confronts the lower portion of the end plate 105 of the wide flange beam 101 as shown in FIG. 7. An overhung auxiliary supporting roller 38 is attached to the right side of the rear end of the moving stand 30 so that it cooperates with the supporting rollers 24, 27 and 28. A freely rotatable roller 39 is mounted on the top face of the front end of the moving stand 30 horizontally on the same height as that of the supporting rollers 24, 27, 28 and 38.

A vertically extending supporting frame 40 is mounted on the top face of the rear portion of the machine stand 2 of the machine proper 1 as shown in FIGS. 2 and 3, and a penetrating hole 41 allowing passage of the wide flange beam 101 is bored in the front-rear direction in the lower portion of the supporting frame 40. A plurality of freely rotatable auxiliary rollers 42 are attached to the lower portion of the penetrating hole 41 horizontally on the same height as that of the above-mentioned rollers 24, 27, 28 and 38. A guide member 43 is attached to the upper portion of the front face of the supporting frame 40 in the longitudinal direction thereof, and a vertical gear box 44 is mounted on the guide member 43 so that it is moved in the vertical direction by a hydraulic cylinder 45 vertically disposed on the top end of the guide member 43. This gear box 44 confronts both the left and right gear boxes 4 and 8 in the front-rear direction of the machine proper 1.

As shown in FIG. 2, two left and right rows of drills 46, each row consisting of three drills, are downwardly disposed on the lower face of the vertical gear box 44 through movable members 47, holding members 48 and drill-fitting spindles 49, and they are simultaneously rotated and driven by a motor 50 fixed on the left side of the gear box 44. Each drill 46 is arranged so that its position can be adjusted in the front-rear direction and in the left-right direction. This distance between every two adjacent drills 46 in the front-rear direction is the same as the drill distance in the front-rear direction in the drills 10 on the left and right gear boxes 4 and 8. Like the drills 10 on the left and right gear boxes 4 and 8, these drills 46 are disposed dismountably to the respective spindles 49, and the number of the drills 46 can optionally be changed as well as the number of the holding members 48.

An attachment frame 51 is vertically mounted on the top face of the front end portion of the machine stand 2 to bridge both the left and right gear boxes 4 and 8. The attachment frame 51 has a gate-like shape in the front and a lateral frame portion 52 thereof is located in front of the vertical gear 44. As shown in FIG. 3, a pair of front and rear clamp hydraulic cylinders 53 and 54 are disposed on the lower face of the almost central part of the lateral frame portion 52 and above the penetrating hole 41 of the supporting frame 40, respectively, so that their positions can be adjusted in the left-right direction. Pressing members 55 are attached to the lower ends of the hydraulic cylinders 53 and 54 and each has a reactangular shape extending in the lateral direction. At the step of processing the landslide protection wide flange beam 101, these pressing members 55 simultaneously press and fix the top faces of both the left and right flanges 104 of the beam 101 from above.

The mechanism for feeding landslide protection wide flange beams 101 onto the drilling machine proper 1 having the above-described structure will now be illustrated.

As shown in FIGS. 3 and 4, a delivery device 56 and a discharge device 57 are disposed adjacently to the front and rear sides of the machine proper 1, respectively, and a landslide protection wide flange beam 101 is moved to and fro by these devices 56 and 57. The positions of the delivery and discharge devices 56 and 57 in the left-right direction correspond to those of the freely rotatable roller 39 and auxiliary roller 42. A plurality of driving rollers 59 are horizontally disposed on respective machine frames 58 of the delivery and discharge devices 56 and 57 on the same height as that of the supporting rollers 24, 27 and 28 and freely rotatable roller 39 of the machine proper 1, so that they can be rotated in normal and reverse directions and can freely turn. A guide roller 60 is vertically disposed between every two adjacent driving rollers 60 on the top face of the left end of the machine frame 58. These guide rollers 60 are freely rotatable and are arranged in a line in the front-rear direction. The rollers 60 bear against the left flange 104a of the landslide protection wide flange beam 101 to guide the beam 101 backward or frontward. The bearing contact portion of each guide roller 60 is located on the same plane as the bearing contact face of the doubling plate 23 of the fixed gripping member 16.

Auxiliary clamps 61 are disposed laterally between the corresponding driving and guide rollers 59 and 60 on the upper faces of the machine frames 58 of the delivery and discharge devices 56 and 57 so that when the wide flange beam 101 is clamped between the fixed and movable gripping members 16 and 17 on the machine proper 1, the auxiliary clamps 61 co-operate with the gripping members 16 and 17 to clamp the lower end of the left flange 104a of the wide flange beam 101. The auxiliary clamp 61 comprises a fixed gripping piece 62 disposed vertically on the top face of the left end of the machine fame 58, a movable gripping piece 63 for clamping the lower end of the left flange 104a of the beam 101 between the fixed gripping piece 62 and the movable gripping piece 63 and a hydraulic cylinder 64 mounted on a part of the machine frame 58 so that it can incline so as to move the movable gripping piece 63 obliquely in the vertical direction or in the left-right direction. The hydraulic cylinder 64 is always located below the driving rollers 59, and the movable gripping piece 63 projects upwardly beyond the rollers 59 at the step of gripping the landslide protection wide flange beam 101 but it retreats downwardly below the rollers 59 while the beam 101 is not gripped. The clamp face of the fixed gripping piece 62, like that of the guide roller 60, is located on the same plane as the bearing contact face of the doubling plate 23 of the fixed gripping member 16.

A feed handle 65 is attached to the left side of the machine frame 58 of the delivery device 56, and when the operation state of the driving rollers 59 of the delivery and discharge devices 56 and 57 is changed over to the free rotation state, the feed handle 65 is manually turned to simultaneously rotate the rollers 59 in the normal or reverse direction.

The operation of the multiple spindle drilling machine having the above structure will now be described.

When the flanges 104 and web 103 of a landslide protection wide flange beam 101 are drilled by this multiple spindle drilling machine, the left and right positions of the supporting rollers 27 and 28 of the movable gripping member 17 are first adjusted so that the distance between said left-right positions is slightly broader than the width of the wide falnge beam 101 (the length between both the left and right flanges 104), and the vertical positions of the drills 10 on the side faces of the left and right gear boxes 4 and 8 and the left-right positions of the drills 46 on the lower face of the vertical gear box 44 are set by the hydraulic cylinder 15 according to the height and width of the beam 101. At this time, the stopper 25 mounted on the attachment 19 of the fixed gripping member 16 is projected to the right, and the moving stand 30 of the feed device 109 is shifted on the supporting stand 29 toward the front end thereof. Simultaneously, the chuck mechanism 31 is released and the feed length of the beam 101 by the feed device 109 is set at a predetermined value. Adjustment of the positions of the supporting rollers 27 and 28 of the movable gripping member 17 is accomplished by moving the slide member 7 to the left or right along the guide rail 6 together with the gripping member 17.

When the preparation for drilling is thus completed, the top end of the landslide protection wide flange beam 101 is placed onto the driving rollers 59 of the delivery device 59 from the front of the drilling machine proper 1, and the rollers 59 are driven and rotated in the normal direction. At this moment, the left flange 104a of the beam 101 is caused to bear against the guide roller 60. When the driving rollers 59 of the delivery device 56 are rotated in the normal direction, the beam 101 on the rollers 59 is fed backward while being guided by the guide roller 60. At this point, since the chuck mechanism 31 of the feed device 109 is released and the top end of the movable gripping piece 33 is located below the lower end of the end plate 105, the lower portion of the end plate 105 on the top end of the beam 101 is prevented from impinging against the gripping piece 33 or the rear end face stopper 37.

Figure 9A:
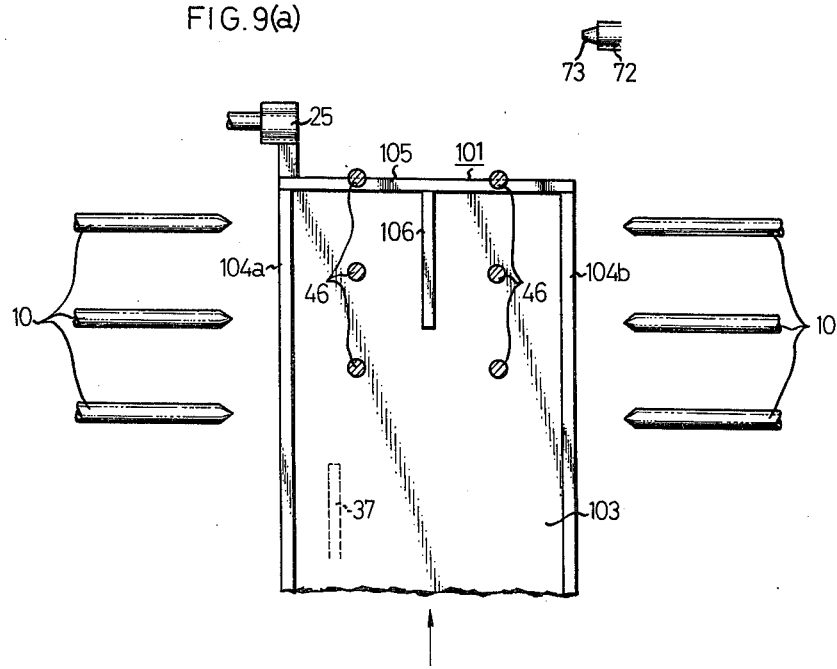
FIGS. 9-(a) and 9-(b) illustrate the operation of positioning the front end of a landslide protection wide flange beam, in which FIG. 9-(a) is a plan view and FIG. 9-(b) is a side view.
Figure 9B:
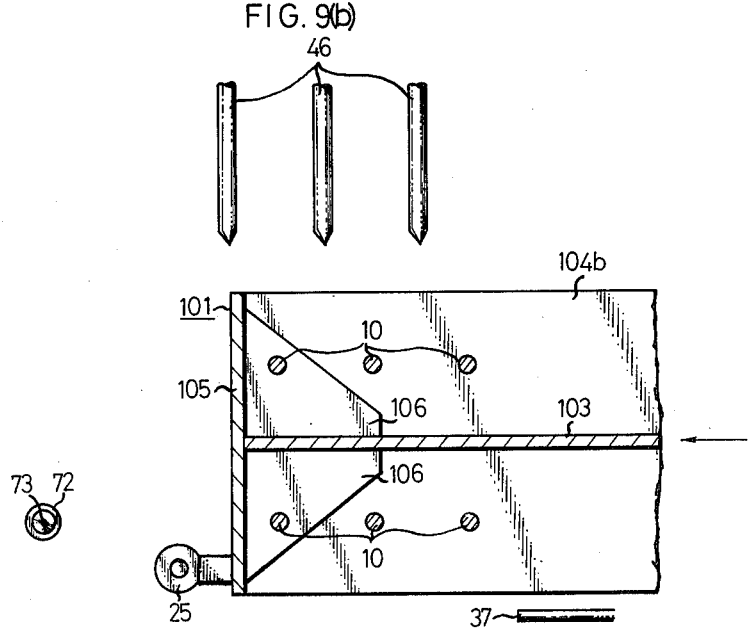

When the top end of the wide flange beam 101 comes close to the rear stopper 25, rotation of the driving rollers 59 is stopped and the rollers 59 are kept in the freely rotatable state. Then, the handle 65 on the left side of the delivery device 56 is manually turned to move slowly the beam 101 further backward and the feeding is stopped at the point where the top end of the beam 101 falls in contact with the rear stopper 25 as shown in FIGS. 9-(a) and 9-(b). Thus, the position of the top end of the landslide protection wide flange beam 101 is set.

After positioning of the top end of the landslide protection wide flange beam 101, the movable gripping member 17 is moved to the left and the beam 101 is gripped and fixed between the doubling plate 26 of the movable gripping member 16 and the doubling plate 23 of the fixed gripping member 16. Simultaneously, the front hydraulic cylinder 53 mounted on the attachment frame 51 is actuated to press and fix the top ends of both the flanges 104 of the beam 101 from above by the pressing member 55 of the cylinder 53. At this time, also the auxiliary clamp 61 of the delivery device 56 is actuated to grip the lower end of the left flange 104a of the beam 101 between the fixed gripping piece 62 and movable gripping piece 63 of the auxiliary clamp 61, whereby the part of the beam 101 slightly deviated forwardly from between both the fixed and movable gripping members 16 and 17 is gripped in the straight posture by this auxiliary clamp 61 and the left-right position of the beam 101 is precisely set. Accordingly, the rear end of the beam 101 is prevented from being deviated to the left or right and the beam 101 is set at a position quite in agreement with the arrangement of the drills 10 and 46.

In this state where the landslide protection wide flange beam 101 is completely fixed in the correct position, the hydraulic cylinders 5 and 9 fixed to the guide member 3 and slide member 7 of the machine proper 1 are actuated and simultaneously, the drills 10 are driven and rotated by the motor 14, whereby the left gear box 4 is moved to the right along the guide member 3 and the right gear box 8 is moved to the left along the guide member 7, and a plurality of holes 107 spaced equidistantly in the front-rear direction are bored in the both the left and right flanges 104 of the landslide protection wide flange beam 101 by these drills 10. After this boring operation, both the gear boxes 4 and 8 are retreated to the original positions and stand by for the next boring operation.

After drilling of the flanges 104, the chuck mechanism 31 of the feed device 109 is actuated to grip the lower end of the left flange 104a of the landslide protection wide flange beam 101 between the fixed and movable gripping pieces 36 and 33 thereof as shown in FIGS. 6 and 7, and then, fixation of the beam 101 by the movable gripping member 17, front pressing member 55 and auxiliary clamp 61 is released. Further, the top end face stopper 25 in the projected state is retreated.

Figure 10B:
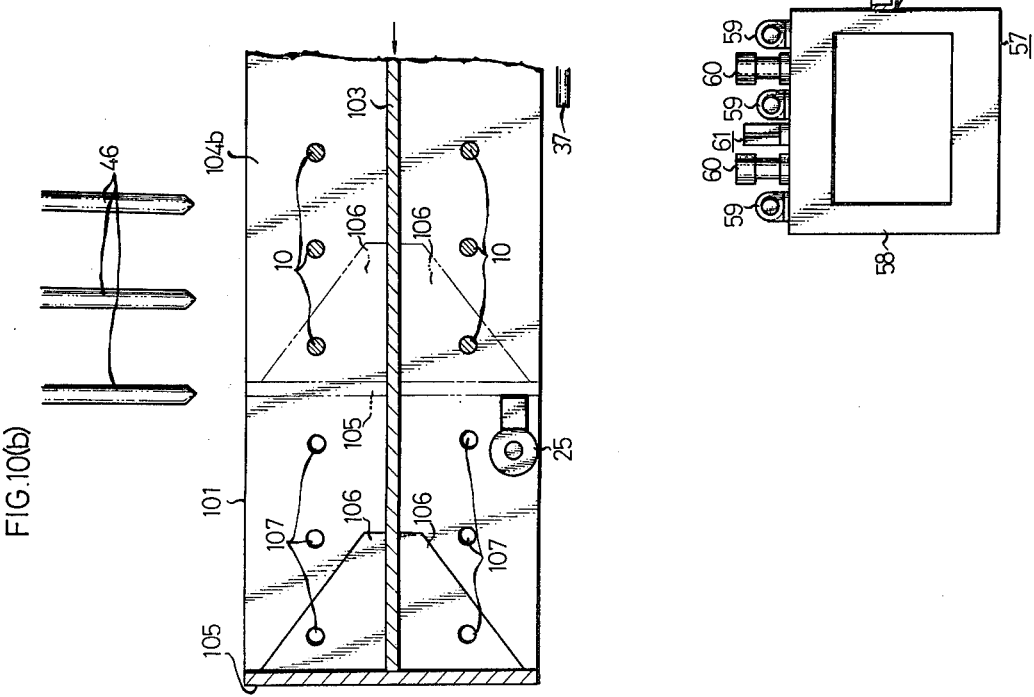
FIGS. 10-(a) and 10-(b) illustrate the state where the first transportation of a landslide protection wide flange beam by the predetermined length feed device shown in FIG. 6 is completed, in which FIG. 10-(a) is a plan view and FIG. 10-(b) is a side view.
Figure 10A:
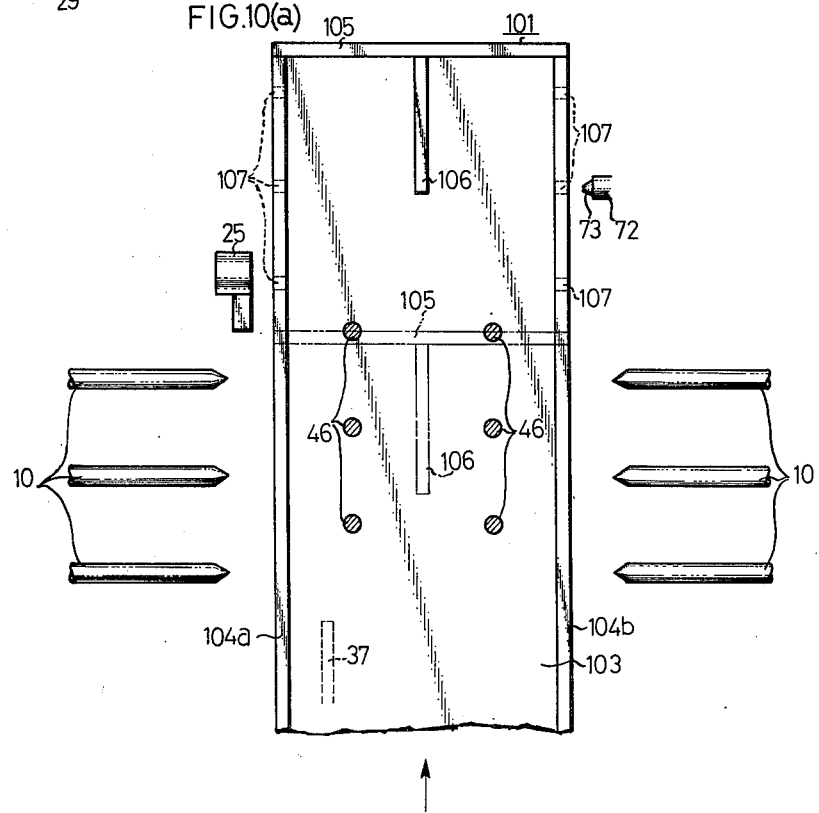

After release of clamping of the landslide protection wide flange beam 101, the moving stand 30 of the feed device 109 is moved on the supporting stand 29 to the rear of the machine stand 2 together with the chuck mechanism 31. At this point, the moving stand 30 is shifted by a predetermined length alone. Accordingly, the beam 101 is fed again backward by a predetermined length alone along the guide roller 60 of the delivery device 56 and the doubling plate 23 of the fixed gripping member 16 on the driving rollers 59, freely rotatable roller 39 and supporting rollers 24, 27 and 28 as shown in FIGS. 10-(a) and 10-(b). In this case, the driving rollers 59 of the delivery device 56 are kept in the freely rotatable state.

After the landslide protection wide flange beam 101 has thus been shifted by a predetermined length, the movable gripping member 17 is moved again to the left while the beam 101 is gripped by the chuck mechanism 31, and the pressing member 55 is moved downwardly and the auxiliary clamp 61 is actuated to fix the beam 101. Then, clamping of the beam 101 by the chuck mechanism 31 is released, and the two hydraulic cylinders 5 and 9 for moving the left and right gear boxed 4 and 8 and the hydraulic cylinder 45 vertically disposed on the guide member on the front face of the supporting frame 40 are actuated. Simultaneously, the drills 10 and 46 are driven and rotated. Coincidentally with the above-memtioned release of the chuck mechanism 31, the moving stand 30 is returned forwardly on the supporting stand 29 and it stands by for the next operation. Simultaneously, by the actions of the hydraulic cylinders 5, 9 and 45, the left and right gear boxes 4 and 8 are moved to the right and left, respectively and the vertical gear box 44 is moved downwardly along the guide member 43. As a result, by the drills 10 and 46, holes 107 spaced equidistantly in the front-rear direction are bored in the flanges 104 and web 103 of the beam 101. After this boring operation, the gear boxes 4, 8 and 44 are returned to the original positions and stand by for the next boring operation.

Then, after the chuck mechanism 31 of the feed device 109 has been actuated, clamping of the landslide protection wide flange beam 101 by the fixed and movable gripping members 16 and 17, pressing member 55 and auxiliary clamp 61 is released, and in the same manner as described above, the beam 101 is transported backward by a predetermined distance by the feed device 109.

The first cycle of the operation of boring the landslide protection wide flange beam 101 has thus been completed. Accordingly, the operation of boring the flanges 101 and web 103 of the beam 101 by the drills 10 and 46 is conducted again, and the operation of boring the left and right flanges 104 of the beam 101 and the operation of shifting the beam 101 backward by a predetermined length by the feed device are repeated in succession. Thus, a great number of holes 107 can be bored on the beam 101 very simply. Incidentally, during the above boring operation, when the top end of the beam 101 reaches the rear portion of the machine stand 2 or comes close to above the delivery device 57, fixation of the beam 101 is accomplished by utilizing the rear pressing member 55 or the auxiliary clamp 61 on the discharge device 57.

When the foregoing drilling operation is repeated, holes 107 are gradually bored in the landslide protection wide flange beam 101 from the top end side thereof while the beam 101 is shifted to the rear of the machine stand 2. However, only the rear ends of the flanges 104 of the beam 101 must be perforated by other drilling operation. This operation of drilling the rear end portion of the beam 101 will now be illustrated.

When drilling of the landslide protection wide flanges beam 101 except the rear end portion is completed, the chucking operation of the chuck mechanism 31 is set free while the moving stand 30 of the feed device 109 is kept located on the rear end portion of the supporting stand 29, and then, the beam 101 is shifted further backward while the rear end portion thereof is not bored. Said rear end portion of the beam 101 is then attached to the movable gripping piece 33 of the feed device 109 and is located in the rear of the machine stand 2 by the rear end face stopper 37. As in the case of positioning of the top end of the beam 101, this transportation and positioning of the beam 101 is accomplished by manually rotating the driving rollers 59 of the discharge device 57 through the feed handle 65. Also in this case, the end plate 105 on the rear end of the beam 101 does not interfere with the rear end face stopper 37 or movable gripping piece 33 because the chuck mechanism 31 of the feed device 109 is released.

Figure 11A:
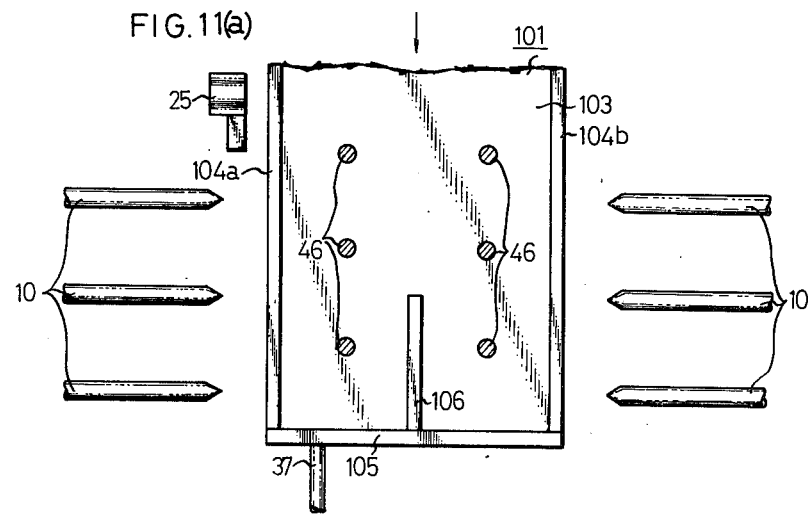
FIGS. 11-(a) and 11-(b) illustrate the operation of positioning the rear end of a landslide protection wide flange beam, in which FIG. 11-(a) is a plan view and FIG. 11-(b) is a side view.
Figure 11B:
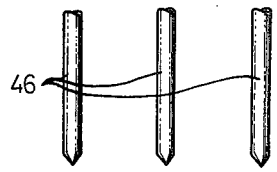

After the landslide protection wide flange beam 101 has thus been shifted to the rear of the end face stopper 37, the chuck mechanism 31 is actuated to move the stopper 37 upwardly together with the movable gripping piece 33. In this state, the beam 101 is manually moved forward (in the reverse direction) through the handle 65, and the rear end plate 105 is caused to bear against the rear end face stopper 37 as shown in FIGS. 11-(a) and 11-(b). Thus, positioning of the rear end of the beam 101 is accomplished.

Then, the landslide protection wide flange beam 101 is fixed by both the gripping members 16 and 17, the rear pressing member 55 and the auxiliary clamp 61 of the discharge device 57, and both the left and right gear boxes 4 and 8 are advanced and the drills 10 are simultaneously rotated, whereby the rear ends of the flanges 104 of the beam 101 can be drilled very easily by the drills 10. The beam 101 on which the drilling operation has been completely performed is fed out in the rear of the drilling machine by rotating the driving rollers 59 of the delivery and discharge devices 56 and 57 in the normal direction.

By the foregoing operation, drilling of the landslide protection wide flange beam 101 is completed in the drilling machine of the present invention.

In the multiple spindle drilling machine of the present invention, the feed pitch correcting device 108 is disposed to correct the feed pitch of the landslide protection wide flange beam 101 at every drilling operation. This feed pitch correcting device 108 will now be described in detail by reference to FIGS. 5, 12 and 13.

Figure 13:
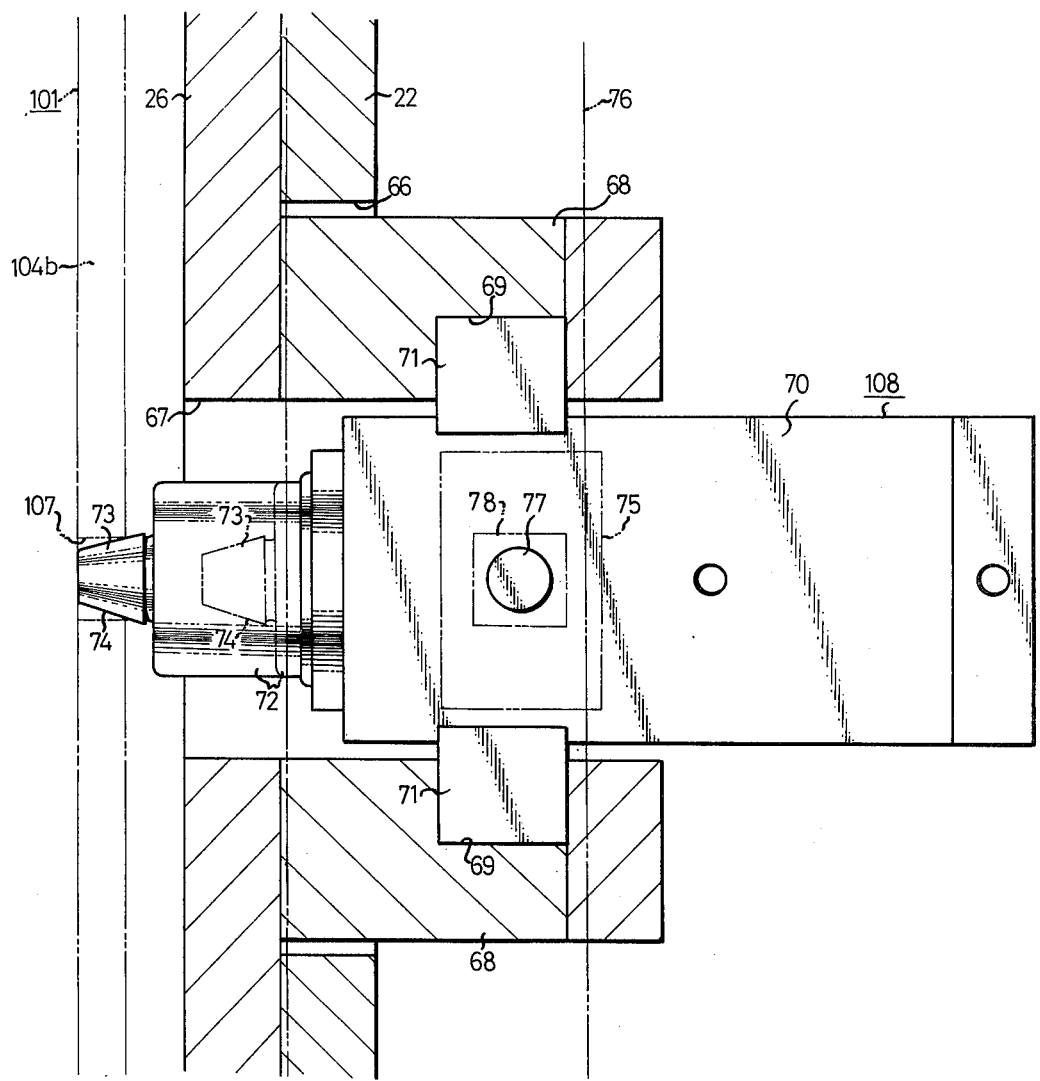
FIG. 13 is a view showing the cross-section of the feed pitch correcting device shown in FIG. 12.

An attachment hole 66 is longitudinally perforated in the central portion of the rear attachment 22 of the gripping member 17 with a substantial width, and a narrow projecting hole 67 is longitudinally perforated in the doubling plate 26 fixed to the rear attachment 22 in the position corresponding to the position of the attachment hole 66. As shown in FIG. 13, a pair of guide rails 68 are projected from the outer side face (right side face) of the doubling plate 26 outwardly through the attachment hole 66 of the rear attachment 22, and the height of the guide rails 68 is the same as that of the projecting hole 67 of the doubling plate 26. A pair of slide grooves 69 are formed on the confronting faces of the respective guide rails 68 along the entire longitudinal length thereof.

A hydraulic cylinder 70 is disposed inwardly and horizontally between said pair of the guide rails 68 so that when a pair of sliding pieces 71 are inserted in the slide grooves 69 of the guide rials 68, the cylinder 70 is moved and slid only in the vertical direction but is not allowed to move in the front-rear direction. The cylinder 70 comprises a rod 72 and a taper pin 73 projected at the center of the top end of the rod 72. In general, the taper pin 73 is retreated from the contact face of the doubling plate 26 as indicated by two-dot chain lines in FIGS. 12 and 13, but when it is operated, it is projected toward the landslide protection wide flange beam 101 at a position corresponding to any one of many holes 107 of the beam 101 while the beam 101 is in the stationary state.

The taper pin 73 has a frustoconical shape tapered toward the top end, and the diameter of the top end is smaller than the diameter of the hole 107 of the landslide protection wide flange beam 101 but the diameter of the base of the taper pin 73 is larger than that of the hole 107. Further, the length of the taper pin 73 is larger than the thickness of the flange 104 of the beam 101. Accordingly, when the taper pin 73 is projected as indicated by solid lines in FIG. 13, a part of the pin 73 is fitted in the hole 107 of the right flange 104b from the outside thereof, the tapered face 74 of the pin 73 hits on the inner circumferential edge of the outer end of the hole 107 and the axis of the pin 73 is made in agreement with the center of the hole 107.

Figure 12:
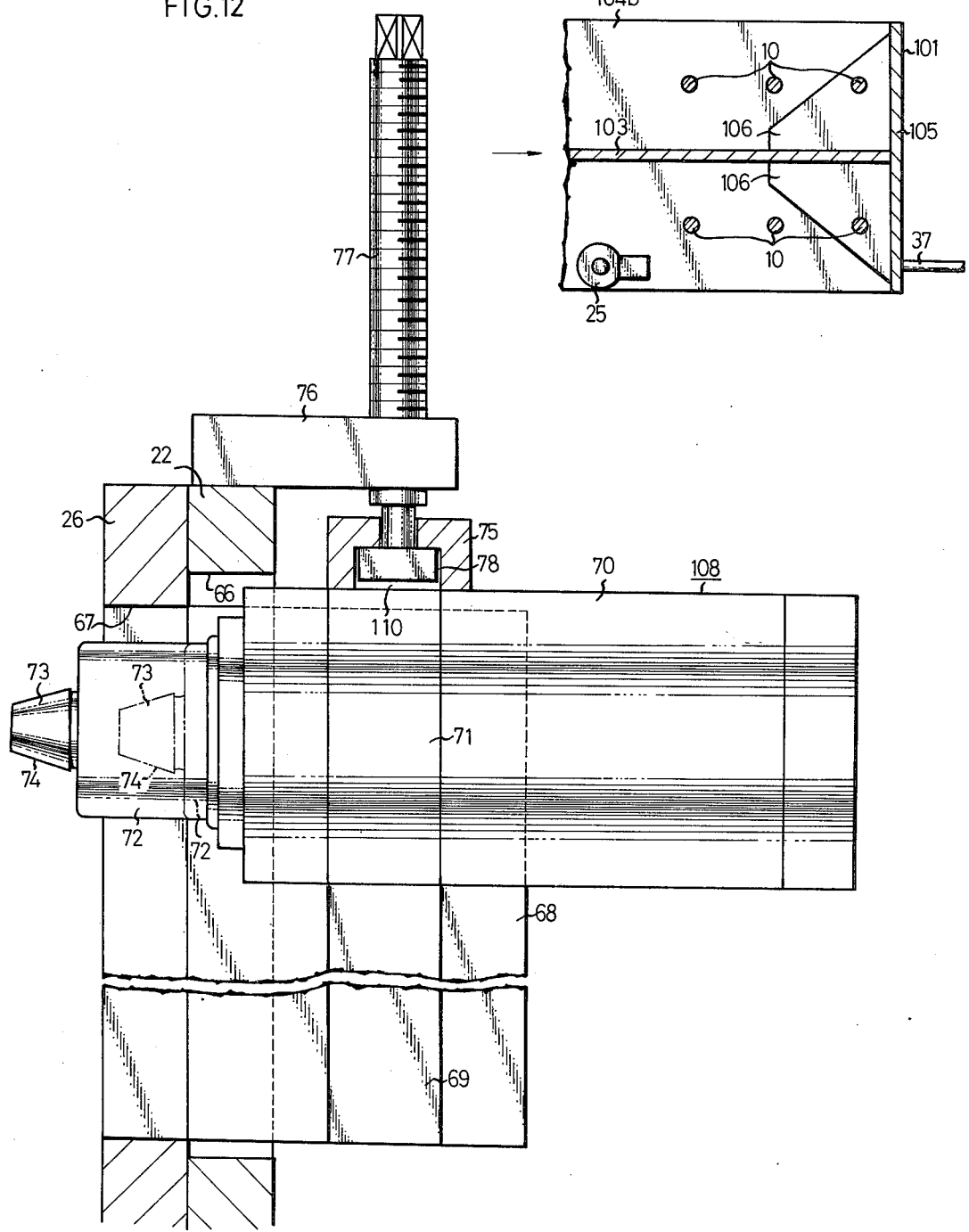
FIG. 12 is a view showing the longitudinal section of a feed pitch correcting device.

As shown in FIG. 12, a supporting frame 75 is attached on the top face of the hydraulic cylinder 70 between said pair of the slide pieces 71, and a fixed plate 76 is fixed to the top face of the rear attachment 22 to extend upwardly beyond the supporting frame 75 and a screw lever 77 is screwed into the central portion of the outer side of the fixed plate 76 from above. A handle (not shown) is attached to the top end of the screw lever 77 to rotate it. A hanging member 78 is freely rotatably mounted on the screw lever 77 so that it can hang down the hydraulic cylinder 70 in the supporting frame 75. Accordingly, the hydraulic cylinder 70 is supported in the suspended state through the supporting frame 75 and hanging member 78 by the screw lever 77, and the vertical position of the cylinder 70 is adjusted along the pair of the guide rails 68 by rotation of the screw lever 77.

As shown in FIG. 12, a certain clearance 110 is formed between the lower face of the hanging member 78 on the lower end of the screw lever 77 and the top face of the hydraulic cylinder 70, so that when the taper pin 73 is fitted in the hole 107, a certain deviation of the position of the hole 107 in the vertical direction is permissible.

Figure 1A:
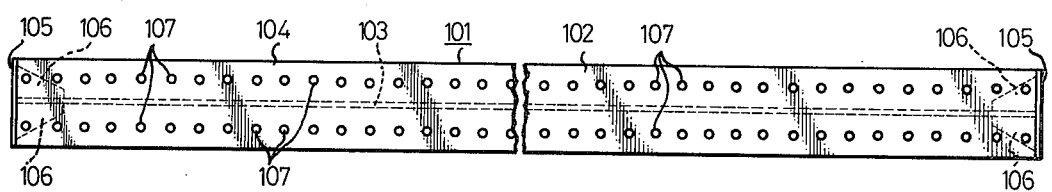
FIG. 1-(a) is a side view of a landslide protection wide flange beam.
Figure 1B:
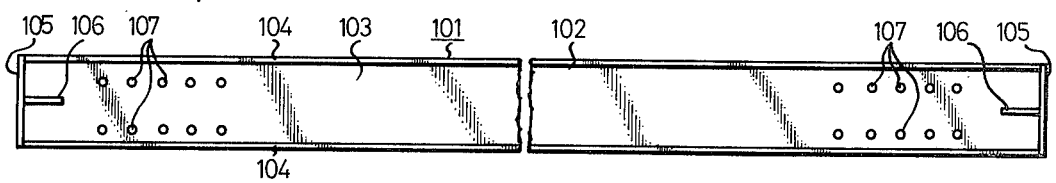
Figure 1C:
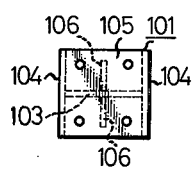

The operation of the feed pitch correcting device 108 having the above-mentioned structure will now be described by reference to an embodiment in which the device 108 is used for drilling a landslide protection wide flange beam 101 as shown in FIG. 1.

The distance in the front-rear direction between every two adjacent drills 10 on both the left and right gear boxes 4 and 8 and the distance in the front-rear direction between every two adjacent drills 46 on the vertical gear box 44 are adjusted to 100 mm, and the latter drills 46 are deviated backward by 50 mm from the former drills 10, respectively. Further, each of the distances from the contact faces of the front end face stopper 25 and rear end face stopper 37 to the frontmost drill 10 and rearmost drill 10, respectively, is set as 50 mm in the front-rear direction. Moreover, the distance along which the landslide protection wide flange beam 101 is transported at a time by the feed device 109 is adjusted to 300 mm and the distance from the rearmost drill 10 to the axis of the taper pin 73 of the feed pitch correcting device 108 is adjusted to 200 mm.

When the respective distances are adjusted and set in the above-mentioned manner, the taper pin 73 of the feed pitch correcting device 108 is vertically moved together with the hydraulic cylinder 70 and the height of the taper pin 73 is made in agreement with the height of the upper or lower drill 10 of the right gear box 8. It is preferred that the height of the taper pin 73 be adjusted so that the axis thereof is located slightly below the axis of the drill 10. Adjustment of the vertical position of the taper pin 73 is accomplished by rotating the screw lever 77 by the handle to introduce the screw lever 77 into the fixed plate 76 or retreat the lever 77 from the plate 76 and vertically moving the hydraulic cylinder 70 along the slide grooves 69 of the guide rails 68 through the hanging member 78 and supporting frame 75. This adjustment can be performed very conveniently if various collars (not shown) differing in the height are interposed between the fixed plate 76 and the supporting frame 75.

After adjustment of the vertical position of the taper pin 73, every time one backward transportation of the landslide protection wide flange beam 101 by the feed device 109 is completed during the above-mentioned drilling operation, the hydraulic cylinder 70 is actuated prior to the gripping and fixing operation by the fixed and movable gripping members 16 and 17 and the like, so that the taper pin 73 is inwardly projected from the projecting hole 67 of the doubling plate 26. Accordingly, at the time of completion of every prescribed length transportation, holes 107 formed by the drills 10 before said transportation are moved backward by the same distance as the predetermined transportation length, namely 300 mm. Therefore, the hole 107 formed 300 mm ahead of the taper pin 73, namely the hole 107 formed by the central drill 10, comes to confront the taper pin 73 after the predetermined length transportation and the top end portion of the pin 73 is fitted in the said hole 107. If the transportation length is not precisely 300 mm, since the axis of the pin 73 is not in agreement with the center of the hole 107, only the front side or rear side of the tapered face 74 of the pin 73 hits on the inner circumferential edge of the outer end of the hole 107 and the tapered face 74 makes an action of moving the beam 101 forward or backward at said part of the hole 107. Accordingly, even if the distance of transportation by the feed device 109 is not exactly 300 mm, the erroneous distance can be thus corrected precisely to 300 mm. If this correction of the transportation distance is repeated at every predetermined length transportation, accumulation of errors can be prevented assuredly.

In the case where the taper pin 73 is fitted in the hole 107 on the landslide protection wide flange beam 101, if the axis of the pin 73 is slightly deviated downwardly from the center of the hole 107, even when the vertical position of the hole 107 is slightly deviated upwardly by the escape of the drill 10 at the time of drilling or for other certain reason, the taper pin 73 per se moves upwardly together with the hydraulic cylinder 70 within the clearance 110 between the top face of the hydraulic cylinder 70 and the lower face the hanging member 78 irrespective of the vertical position of the screw lever 77 and the taper pin 73 can be fitted in the hole 107 in a good condition assuredly. After the above operation, the taper pin 73 is retreated for the first time when the beam 101 is completely fixed by the fixed and movable gripping members 16 and 17, the pressing member 55 and the like.

When a landslide protection wide flange beam other than that shown in FIG. 1 is drilled, the number and distance of the drills 10 or 46 are changed, the positions of the drills 10 are made to correspond to those of the drills 46 in the front-rear direction, or the drills 46 are arranged so that some of them may be retreated upwardly.

In the foregoing embodiment, only one feed pitch correcting device 108 is disposed, but two or more of devices 108 having the above structure may be disposed. Both the stoppers 37 and 25 may be dismountably attached and they may be replaced by other stoppers differing in the size. Furthermore, it is possible to adopt an embodiment in which the feed pitch correcting device 108 is disposed downwardly above the landslide protection wide flange beam 101 and the taper pin 73 is inserted from above into a hole 107 formed on the web 103 of the beam 101 to effect the correcting operation. Of course, the device 108 may be disposed upwardly below the beam 101.

As will be apparent from the foregoing illustration, when the multiple spindle drilling machine of the present invention is employed, the operation of drilling a landslide protection wide flange beam 101 can be accomplished continuously at high efficiency with precision.

The present invention has been described in detail to some extent by reference to the most preferred embodiments. As will be apparent to those skilled in the art, various modifications will be made to the present invention within the spirit and scope of the invention, and the present invention is not limited to specific embodiment thereof except those specified in the appended claims.

What is claimed is:

1. A multi spindle drilling machine for landslide protection wide flange beams, comprising in combination:
   (a) a machine stand;
   (b) a supporting device mounted on said stand to support a wide flange beam as said beam moves along a longitudinal travel path extending from the front side of the machine, past a work station, to the rear side of the machine;
   (c) a feed device (109) mounted on the machine stand in advance of the supporting device and having a chuck mechanism (31) for gripping a flange of said beam so that the feed device grips the beam by the chuck mechanism to transport the beam onto the supporting device intermittently by a predetermined length per stroke of advance;
   (d) fixing means mounted on the machine stand disposed so as to be opposite both flanges of said beam so as to fix the beam unmovably on said supporting device at every stroke that the beam is transported by the feed device (109) intermittently;
   (e) a drilling device (10) having at least one drill (46) disposed at a predetermined position in the direction of transportation of said beam by the feed device on said stand so as to drill an aperture in the surface of at least one of the flanges and the web of the beam when it is fixed on the supporting device by said fixing means; and, a feed pitch correcting device (108) disposed past said drilling device position at work station at a distance corresponding to the intermittent transportation distance of the beam by the feed device and having a substantially large frusto-conical taper pin strong enough to move the beam by the pressure of the taper as it enters an aperture in said beam, said taper pin being so disposed as to be inserted into the aperture previously drilled in the beam by said drilling device, said feed pitch correcting device (108) including moving means to advance and retreat said taper pin, whereby the beam is moved in the direction of feeding on the supporting device and corrected at the drilling position when the beam is not being transported.

2. A machine as set forth in claim 1 wherein said feed device includes a moving stand for supporting the chuck mechanism mounted on the machine stand to be reciprocated to the front and rear sides on the machine stand, said moving stand moving backward by a predetermined distance to transport the beam by a predetermined length where said chuck mechanism grips and holds the lower end of one flange of said beam, and after said transportation movement said beam is released from the chuck mechanism and said moving stand is returned forward to its original position.

3. A machine as set forth in claim 1 wherein said chuck mechanism comprises an inclined piece, the lower end of which is mounted on the moving stand so that said lower end can be inclined to the moving stand, a movable gripping piece fixed to the top end of the inclined piece so that the top end of said movable gripping piece is directed upwardly, a hydraulic cylinder for inclining said inclined and movable pieces integrally through an interlocking link, and a fixed gripping piece mounted on said moving stand so that said beam is gripped between said movable gripping piece and said fixed gripping piece.

4. A machine as set forth in claim 3 wherein said fixing means comprises a pair of gripping members for gripping and fixing both the flanges of the beam from both sides thereof and at least one pressing member for pressing and fixing both flanges of said beam from above.

5. A machine as set forth in claim 4 wherein said drilling device includes first, second and third mechanisms mounted on said machine stand, said first and second mechanisms being opposite both flanges of said beam so that the drilling mechanisms drill said flanges, said third drilling mechanism being mounted on the machine stand opposite to the web of said beam so that the drilling mechanism drills into said web, and said taper pin is disposed opposite to one flange of said beam so as to be inserted into the aperture on the flange of the beam which is drilled by said first or second mechanisms.

6. A machine as set forth in claim 5 wherein said feed pitch correcting device includes an operation member, said taper pin being horizontally projected toward one flange of said beam, said taper pin being actuated by said operating member, and when said pin is inserted into an aperture in said beam, the taper face of said pin engages with the inner circumferential edge of said aperture.

7. A machine as set forth in claim 6 wherein said operating member is a hydraulic cylinder having a top end with a rod thereat, said taper pin being attached to the top end of said rod.

8. A machine as set forth in claim 7, further comprising front end positioning means disposed on said machine stand in said travel path past said drilling device at a predetermined interval so as to determine the first drilling position on the front end portion of said beam.

9. A machine as set forth in claim 8 wherein said positioning means is a stopper usually disposed on the side of said supporting device to be projected and disposed at a position which can fall in contact with the front end of said beam before said front end is transported.

10. A machine as set forth in claim 9 further comprising delivery means disposed on the front side of the machine stand to feed said beam onto the machine stand at the start of the drilling operation and deliver said beam to the feed device and discharge means disposed on the rear side of the machine stand to discharge the beam on the machine stand from said stand at the time of completion of the drilling operation, and each of said delivery and discharge means comprising a machine frame, a plurality of driving rollers mounted on said machine frame to carry said beam thereon, and at least one guide roller mounted on said machine frame to set the position of said beam in the left-right direction.

11. A machine as set forth in claim 10, further comprising a correcting device for correcting the position of said beam in the left-right direction at the time of drilling said beam, mounted on each of the machine frames of said delivery and discharge means said correcting device being an aixiliary clamp including a fixed gripping piece vertically disposed on the top face of one side end of the machine frame, a movable gripping piece for clamping the lower end of one flange of said beam between said fixed gripping piece and said movable gripping piece and a hydraulic cylinder disposed on a part of the machine frame so that it can be inclined so as to incline said movable gripping piece to the left and right, said auxiliary clamp being arranged so that it clamps said beam in cooperation with said fixed gripping member and movable gripping member to correct the deviation of said beam in the left and right direction.

* * * * *

UNITED STATES PATENT AND TRADEMARK OFFICE
CERTIFICATE OF CORRECTION

PATENT NO. : 4,149,819
DATED : April 17, 1979
INVENTOR(S) : Toshikatsu Kitagawa

It is certified that error appears in the above-identified patent and that said Letters Patent are hereby corrected as shown below:

On the Cover Sheet, Item [73] should read:

--- Miyakawa Industry Company Limited ---.

Signed and Sealed this

Eleventh Day of September 1979

[SEAL]

Attest:

*Attesting Officer*

LUTRELLE F. PARKER
*Acting Commissioner of Patents and Trademarks*